United States Patent
Kwak et al.

(10) Patent No.: US 8,369,528 B2
(45) Date of Patent: Feb. 5, 2013

(54) METHOD AND APPARATUS FOR PROVIDING ENCRYPTED KEY BASED ON DRM TYPE OF HOST DEVICE

(75) Inventors: Ki-Won Kwak, Seongnam-si (KR); Chang-Nam Chu, Yongin-si (KR); Chun-Un Kang, Seoul (KR); Min-Woo Ko, Gwangmyeong-si (KR); Min-Woo Jung, Seoul (KR); Jeong-Su Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1075 days.

(21) Appl. No.: 12/126,478

(22) Filed: May 23, 2008

(65) Prior Publication Data
US 2009/0122991 A1 May 14, 2009

(30) Foreign Application Priority Data

Nov. 8, 2007 (KR) .................. 10-2007-0113778

(51) Int. Cl.
*H04L 9/00* (2006.01)
(52) U.S. Cl. ........ 380/278; 380/277; 713/168; 713/193; 713/194; 726/28; 726/30
(58) Field of Classification Search .................. 380/278
See application file for complete search history.

(56) References Cited

U.S. PATENT DOCUMENTS

| | | | | |
|---|---|---|---|---|
| 6,697,944 | B1 * | 2/2004 | Jones et al. | 713/168 |
| 7,152,166 | B2 * | 12/2006 | Strom et al. | 713/193 |
| 7,174,021 | B2 * | 2/2007 | Krishnaswamy et al. | 380/277 |
| 7,272,858 | B2 * | 9/2007 | Parks et al. | 726/28 |
| 7,395,438 | B2 * | 7/2008 | Parks et al. | 713/194 |
| 7,443,985 | B2 * | 10/2008 | Krishnaswamy et al. | 380/278 |
| 7,472,270 | B2 * | 12/2008 | Evans et al. | 713/155 |
| 2003/0194092 | A1 * | 10/2003 | Parks et al. | 380/281 |
| 2003/0194093 | A1 * | 10/2003 | Evans et al. | 380/282 |
| 2003/0195855 | A1 * | 10/2003 | Parks et al. | 705/51 |
| 2004/0001594 | A1 * | 1/2004 | Krishnaswamy et al. | 380/277 |
| 2007/0288386 | A1 * | 12/2007 | Adachi et al. | 705/58 |
| 2008/0168568 | A1 * | 7/2008 | Brodersen et al. | 726/30 |

FOREIGN PATENT DOCUMENTS

| | | |
|---|---|---|
| JP | 2003-345707 A | 12/2003 |
| JP | 2006-134089 A | 5/2006 |
| KR | 10-2005-0091378 A | 9/2005 |

* cited by examiner

*Primary Examiner* — Kambiz Zand
*Assistant Examiner* — Yonas Bayou
(74) *Attorney, Agent, or Firm* — Sughrue Mion, PLLC

(57) ABSTRACT

A method and apparatus for providing an encrypted key based on a DRM type of a host device are provided. The method includes receiving available DRM type information of a host device, making a request for generation of a key object based on the received available DRM type information, and transmitting the generated key object to the host device.

19 Claims, 7 Drawing Sheets

METHOD AND APPARATUS FOR PROVIDING ENCRYPTED KEY BASED ON DRM TYPE OF HOST DEVICE

CROSS-REFERENCE TO RELATED APPLICATION

This application claims priority from Korean Patent Application No. 10-2007-0113778 filed on Nov. 8, 2007 in the Korean Intellectual Property Office, the disclosure of which is incorporated herein by reference in its entirety.

BACKGROUND OF THE INVENTION

1. Field of the Invention

The present invention relates to a method and apparatus for providing an encrypted key based on a DRM type of a host device, and, more particularly, to a method and apparatus of ensuring compatibility of a host device by providing an encrypted key based on a DRM type of the host device.

2. Description of the Related Art

In general, digital rights management (DRM) is a technique that protects and manages the copyrights of digital content. Content is stored by a content-providing server in encrypted forms and upon a user's purchase request, an encrypted content and key information for decoding the encrypted content are transmitted. DRM specifies a reproducible count, duplicability or count of digital content.

Functions of DRM largely consist of protection of digital content, management of usage regulation, and management of a billing system. DRM technology allows digital content to be protected through an encryption process from generation to distribution/use/disuse of digital content including prevention from illegal distribution or illegal use. In addition, DRM technology allows only a legitimate user who owns an encrypted key to decode and use encrypted content. Even if the digital content is illegally distributed, the digital content cannot be used without the encrypted key, so that it can be protected from illegal use.

FIG. 1 is a diagram illustrating a content playback procedure according to conventional DRM.

Referring to FIG. 1, for the purposes of preventing digital content from being coped and controlling digital content from being distributed, if a predetermined content provider 10 selects a particular solution, e.g., DRM A, and adopts the selected DRM A to generate content, digital content 20 adopting the DRM A can be used on only a device 30 that can be supported by DRM A.

This is because a format of the digital content 20 is converted into a DRM A-dependent one and there is no open service system for providing compatibility between a DRM A system and the device 30 that reads the content of the converted format and attempting to play back the content.

Thus, the DRM-adopting content is dependent on the pertinent DRM technology and the specific solution, and DRM compatibility cannot be ensured between various devices.

Further, there has never been an open system for providing DRM compatibility, which allows content providers, service providers, DRM providers, device manufacturers to freely participate in the DRM system.

Korean Published Patent No. 2005-0091378 discloses a technology entitled "Shift Register and Display Apparatus Comprising the same" in which a plurality of stages are connected to each other and sequentially generate output signals, each stage generating an output signal according to one of a plurality of clock signals having a duty ratio of less than 50% and different phases in response to outputs of two different stages. However, in the disclosed patent, there is no teaching about technology of providing an encrypted key based on a DRM type of a host device.

SUMMARY OF THE INVENTION

The present invention provides a method and apparatus of ensuring compatibility of a host device by providing an encrypted key based on a DRM type of the host device.

The above and other objects of the present invention will be described in or be apparent from the following description of the exemplary embodiments.

According to an aspect of the present invention, there is provided a method of providing an encrypted key based on a DRM type of a host device, the method including receiving available DRM type information of a host device, making a request for generation of a key object based on the received available DRM type information, and transmitting the generated key object to the host device.

According to another aspect of the present invention, there is provided an apparatus for providing an encrypted key based on a DRM type of a host device, the apparatus including a transceiver receiving available DRM type information from a host device, a message generator which generates a request message for generation of a key object based on the received available DRM type information, and a content key container which generates a content key container based on a decryption key of the content used by the host device.

According to yet another aspect of the present invention, there is provided a method of providing an encrypted message key, the method including generating a key object based on a DRM type information of a host device and transmitting the key to the host device.

BRIEF DESCRIPTION OF THE DRAWINGS

The above and other features and advantages of the present invention will become apparent by describing in detail exemplary embodiments thereof with reference to the attached drawings in which.

DETAILED DESCRIPTION OF THE INVENTION

Figure 1:
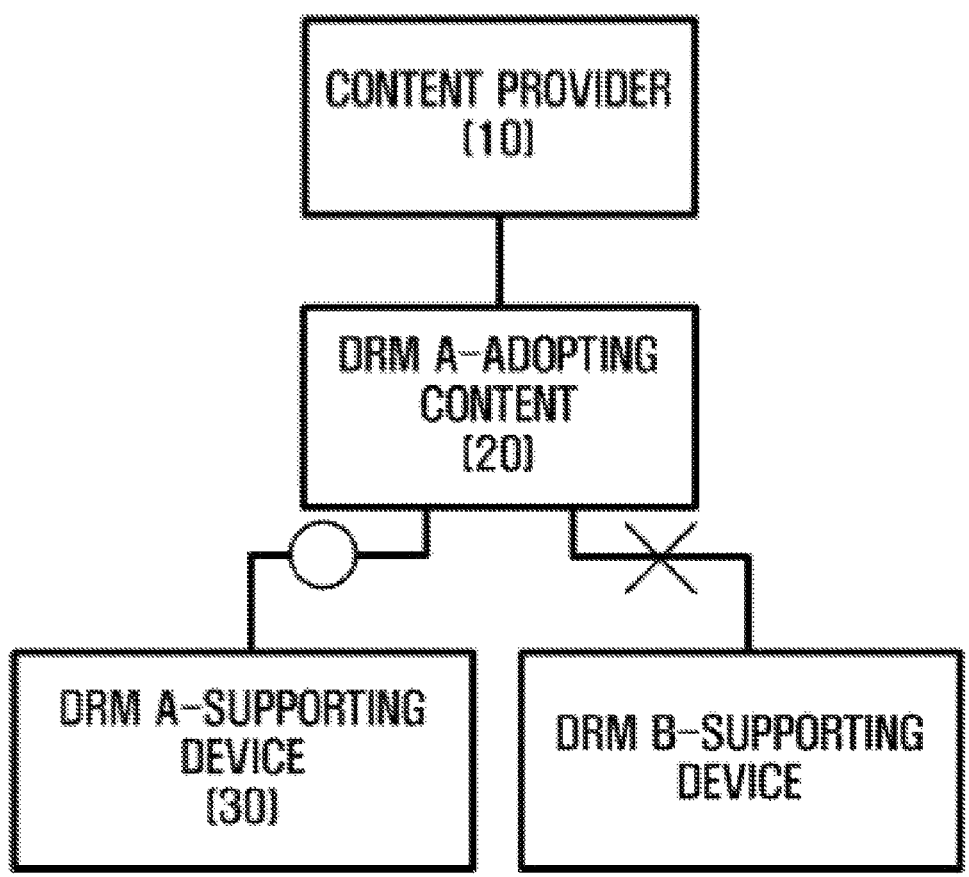
FIG. 1 is a diagram illustrating a playback procedure of content according to conventional DRM.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 2:
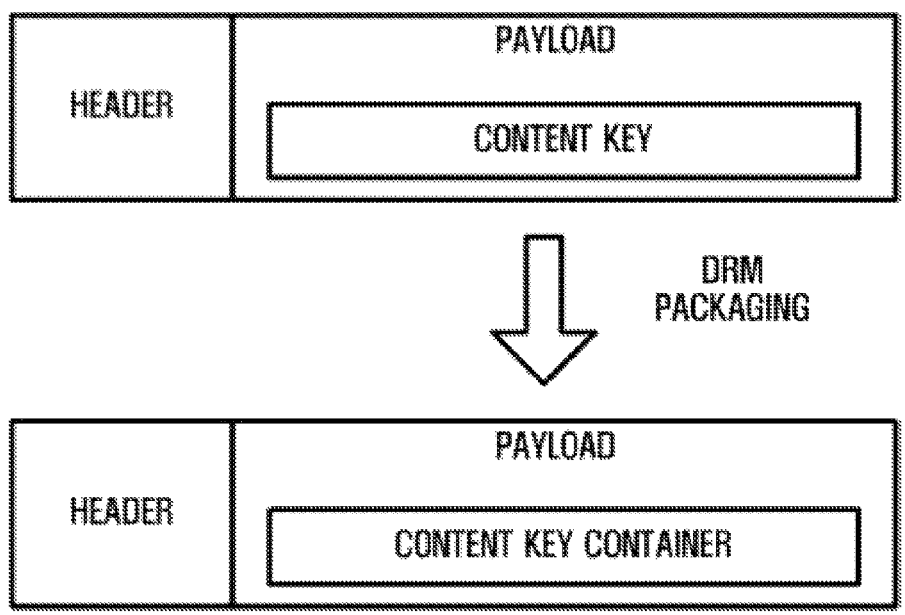
FIG. 2 illustrates a frame structure of a DRM file in an apparatus for providing an encrypted key based on a DRM type of a host device according an exemplary embodiment of the present invention.

FIG. 2 illustrates a frame structure of a DRM file in an apparatus for providing an encrypted key based on a DRM type of a host device according an exemplary embodiment of the present invention.

As shown in FIG. 2, in a frame of a DRM file, a content key is contained in a payload portion. The content key means a symmetric key for encrypting content. A DRM-providing server performs DRM packaging on the frame of the DRM file. Here, the DRM packaging means binding using a content-encrypted key based on the DRM type supported by a user's host device.

Then, after completion of the DRM packaging, a content key container is included in the payload portion of the DRM file frame structure. Here, the content key container is an entity of data generated from an encrypted key input by a content-providing server in compliant with a data format requested by the DRM-providing server. That is, the DRM file frame is converted into a data format (e.g., OMA to dcf, WMDRM to asf) that can be processed by the DRM-providing server.

Data of a DRM file format includes an encrypted content key, information about use rights, and metadata, and key objects suitable to the DRM type supported by the user's host device are generated based on the data of the DRM file format.

Figure 3:
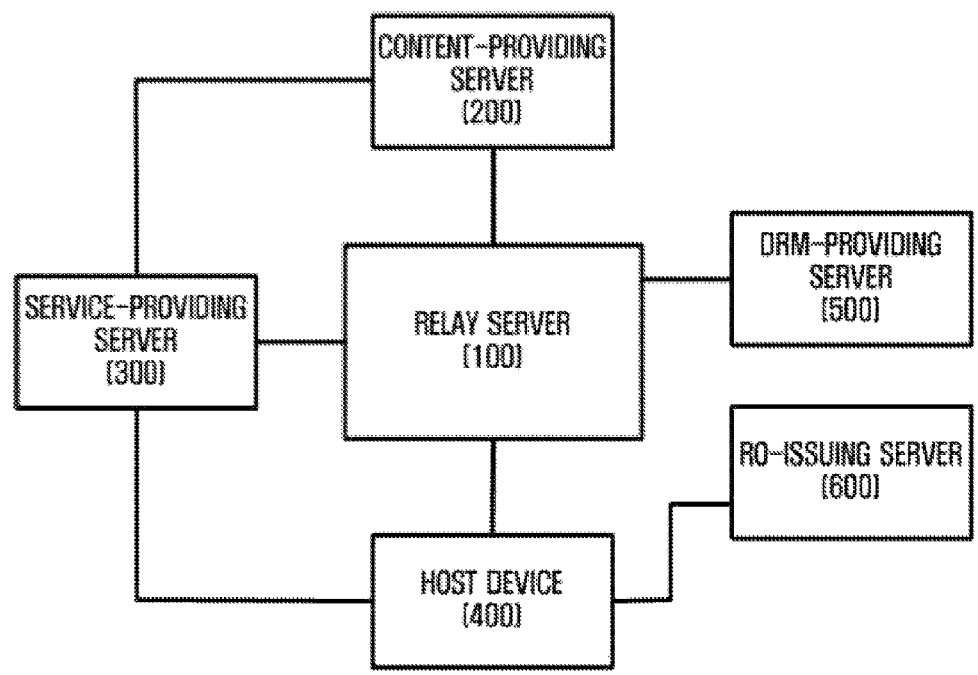
FIG. 3 is a diagram illustrating a system for providing an encrypted key based on a DRM type of a host device according an exemplary embodiment of the present invention.

FIG. 3 is a diagram illustrating a system for providing an encrypted key based on a DRM type of a host device according an exemplary embodiment of the present invention.

As shown in FIG. 3, the system for providing an encrypted key based on the DRM type of a host device according an exemplary embodiment of the present invention includes a relay server 100, a content-providing server 200, a service-providing server 300, a host device 400, a DRM-providing server 500 and a rights object (RO)-issuing server 600.

The content-providing server 200 communicates with the relay server 100 and requests information to be provided about content (for example, content identifier, information about use rights, metadata, decryption key, etc.) and to register a service. Here, the content may include, but is not limited to, movies, music, photos, games, documents, and so on. In addition, the metadata refers to various kinds of information about content. For example, in the case of music file content, the metadata may include album information, singer information, a song title, play back time information, and so on.

That is, in order to distribute predetermined content to a user who wishes to use the content, the content-providing server 200 records metadata for the content, sets use rights in order to adopt a service business, decides on a content price, and registers it in the relay server 100. Here, the content-providing server 200 encrypts the content using an ordinary encryption algorithm (e.g., AES 128). That is, it is not necessary to separately generate content adopting various DRM technologies (e.g., MS DRM (Microsoft DRM) and OMA DRM (Open Mobile Alliance DRM)).

The service-providing server 300 receives encrypted content from the content-providing server 200, communicates with the relay server 100 to make a request for information necessary for constructing the service of the content, and offers the information for constructing the service of the content in response to the request to the host device 400.

The host device 400 receives the content service and the encrypted content from the service-providing server 300, provides available DRM type information necessary to use the received encrypted content to the relay server 100 to request issuance of a decryption key (that is, a key object) for the content. Here, the key object is a decryption key of the content used by the host device. Meanwhile, in the case where the host device 400 attempts at use after completion of DRM packaging with the available DRM technology, use rights input by the content-providing server 200 for the first time may apply to the key object.

Further, the host device 400 requests the RO issuing server 600 to issue a rights object to use the encrypted content. Here, the host device 400 is a device capable of playing back content by consuming a license and the rights object. For example, the host device 400 may be a portable content playback device, such as a mobile phone, a PDA, or an MP3 player, or a fixed content playback device, such as a desktop computer, or a digital TV.

Since the host device 400 is supplied with the key object based on available DRM types, it is necessary to prepare separate equipment for playing back content adopting various DRM technologies.

The DRM-providing server 500 performs packaging based on the available DRM type information of the host device 400, the content key container, use rights, or metadata, received from the relay server 100, and generates the key object. Here, the DRM-providing server 500 is interoperable with MS DRM, OMA DRM, or the like.

The RO issuing server 600 provides a rights object suitable to the host device 400 as requested by the host device 400. Here, the rights object is a kind of license (that is, a DRM license) having use rights. The DRM license may include content-encrypted key (CEK), content ID of content that can be decrypted using permission information, constraint information, and content-encrypted key.

The relay server 100 receives available DRM type from the host device 400, provides the same to the DRM-providing server 500 to request the key object, and provides the key object transmitted from the DRM-providing server 500 to the host device 400. Here, since the key object containing a decryption key has use rights based on DRM technology operable in the host device 400, DRM compatibility with the host device 400 can be ensured.

In addition, the relay server 100 stores content information (for example, content identifier, use rights, metadata, decryption key, and others) received from the content-providing server 200, and provides the information necessary for constructing the content service to the service-providing server 300.

Figure 4:
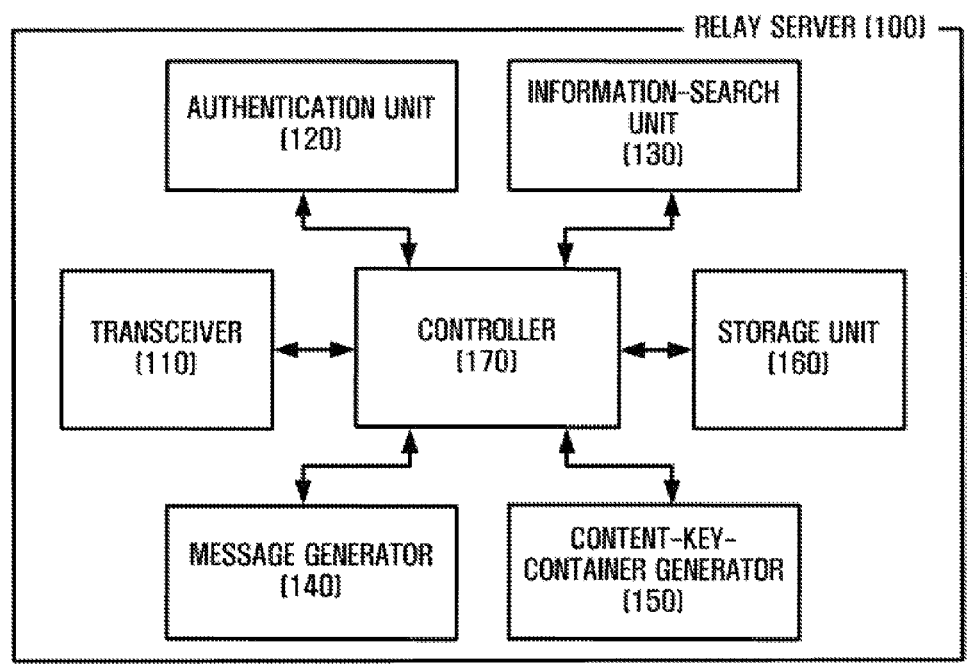
FIG. 4 is a block diagram of a relay server in the system for providing an encrypted key based on the DRM type of a host device according an exemplary embodiment of the present invention.

FIG. 4 is a block diagram of a relay server in the system for providing an encrypted key based on a DRM type of a host device according an exemplary embodiment of the present invention.

As shown in FIG. 4, the relay server 100 includes a transceiver 110, an authentication unit 120, an information search unit 130, a message generator 140, a content key container generator 150, a storage unit 160, and a controller 170.

The term "unit" used herein means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and modules or further separated into additional components and units.

The transceiver 110 communicates with the content-providing server 200, the service-providing server 300, the host device 400, and the DRM-providing server 500, and transceives predetermined information, message and a key object. For example, the transceiver 110 receives a request message for service registration and content information (for example, content identifier, use rights, metadata, decryption key, and others) transmitted from the content-providing server 200, and receives a request message making a request for information necessary for constructing the service of the content from the service-providing server 300. In addition, the transceiver 110 receives available DRM type information from the host device 400.

Further, the transceiver 110 transmits a response message for the service registration to the content-providing server 200, transmits the information necessary for constructing the service of the requested content to the service-providing server 300, and transmits a key object containing a decryption key to the host device 400.

In addition, the transceiver 110 transmits the available DRM type information of the host device 400 to the DRM-providing server 500, and receives the key object generated by the DRM-providing server 500.

The authentication unit 120 verifies the messages transmitted from the content-providing server 200, the service-providing server 300, and the host device 400 and validity of content ID, and authenticates validity.

When the service-providing server 300 makes a request for information necessary for constructing the service of a particular content based on content ID, the information search unit 130 searches the information necessary for constructing the service of the particular content corresponding to the content ID, for example, use rights and metadata, and others, and provides the same.

The message generator 140 generates a response message transmitted to the content-providing server 200, the service-providing server 300, and the host device 400, and generates a request message transmitted to the DRM-providing server 500.

The content key container generator 150 generates a content key container in which the decryption key provided from the content-providing server 200 is changed into a format required by the DRM-providing server 500.

The storage unit 160 stores information about the content provided from the content-providing server 200 (for example, a content identifier, use rights, metadata, a decryption key, and others).

The controller 170 discriminates available DRM types based on the available DRM type information received from the host device 400, and provides the discriminated DRM type to the DRM-providing server 500 when there is a request for generation of a key object.

In addition, the controller 170 controls operations of various functional blocks 110 to 160 constructing the relay server 100.

Figure 5:
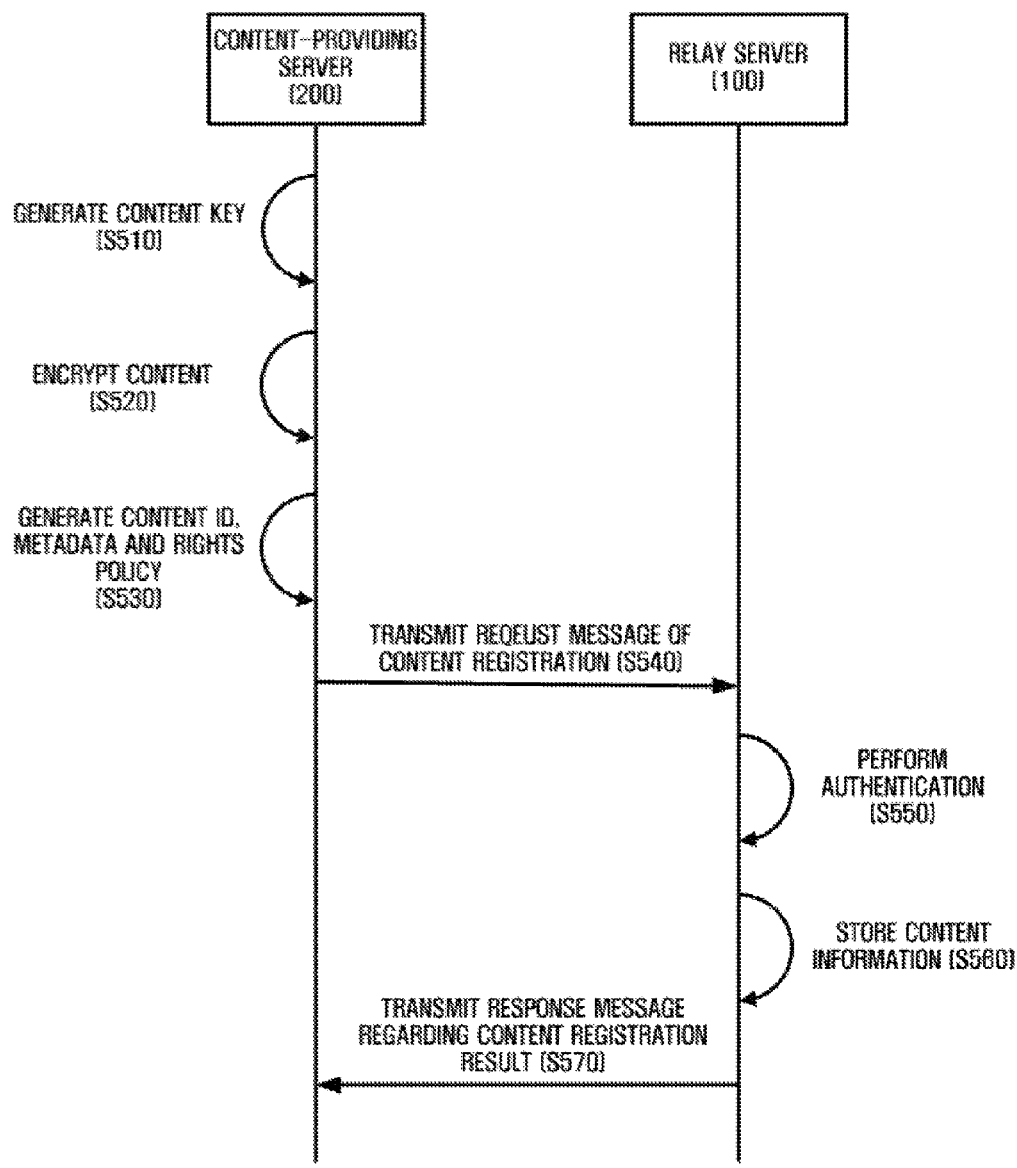
FIG. 5 is a flow diagram illustrating operations executed between a content-providing server and a relay server in the system for providing an encrypted key based on a DRM type of a host device according an exemplary embodiment of the present invention.

FIG. 5 is a flow diagram illustrating operations executed between a content-providing server and a relay server in the system for providing an encrypted key based on a DRM type of a host device according an exemplary embodiment of the present invention.

First, the content-providing server 200 generates a content key for decrypting content using a symmetric key algorithm (S510) to then decrypt the content (S520). Then, content ID, metadata for the content and policy for rights to use the content are generated (S530).

Next, the content-providing server 200 communicates with the relay server 100 and transmits a request message to make a request for the information for the content (for example, content ID, use rights, metadata, content key, and others) and content registration (S540).

The relay server 100 authenticates validity of the content registration request message transmitted from the content-providing server 200 (S550). As the authentication result, when content validity is authenticated, the information for the content (for example, content ID, use rights, metadata, content key, etc.) transmitted from the content-providing server 200 is stored (S560).

Next, a response message about the result of content registration is generated and transmitted to the content-providing server 200 (S570).

Figure 6:
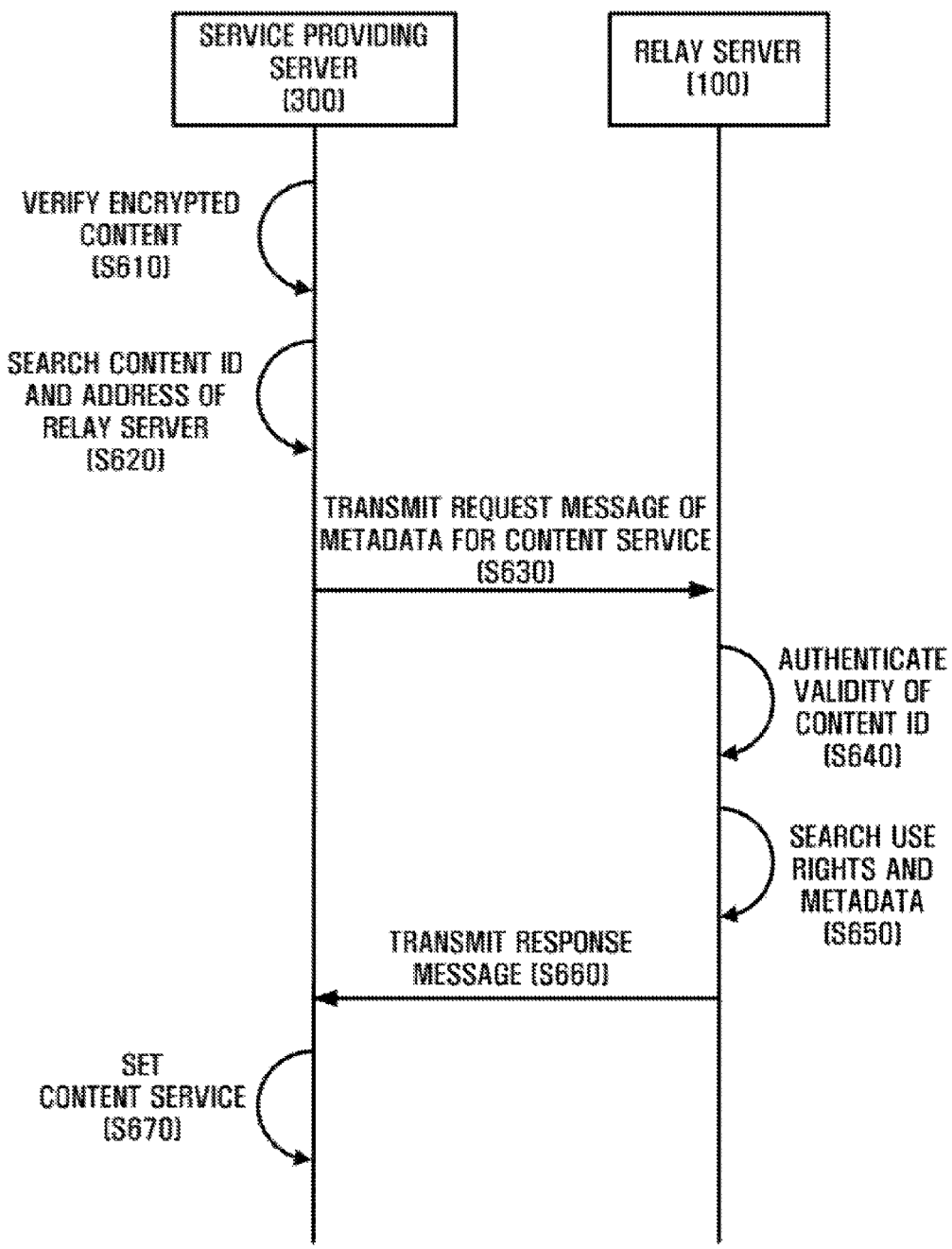
FIG. 6 is a flow diagram illustrating operations executed between a service-providing server and a relay server in the system for providing an encrypted key based on a DRM type of a host device according an exemplary embodiment of the present invention.

FIG. 6 is a flow diagram illustrating operations executed between a service-providing server and a relay server in the system for providing an encrypted key based on a DRM type of a host device according an exemplary embodiment of the present invention.

First, a service-providing server 300 receives encrypted content from a content-providing server 200. Then, the validity of the received encrypted content is verified (S610).

As a verification result, when the encrypted content is valid, the service-providing server 300 searches content ID and an address of a relay server 100 in order to set the content service (S620).

Next, a request message to request metadata for the searched content ID is transmitted to the searched address of the relay server 100 (S630). Here, the metadata of the content refers to information necessary for the content service. For example, in a case of music file content, the metadata may include album information, singer information, a song title, play back time information, and so on.

The relay server 100 checks the validity of the content ID transmitted from the service-providing server 300 (S640). When the content ID is valid, use rights and the metadata are searched for (S650).

Then, a response message is transmitted to the service-providing server 300 along with the use rights and metadata (S660).

The service-providing server 300 sets the content service using the transmitted use rights and metadata (S670).

Figure 7:
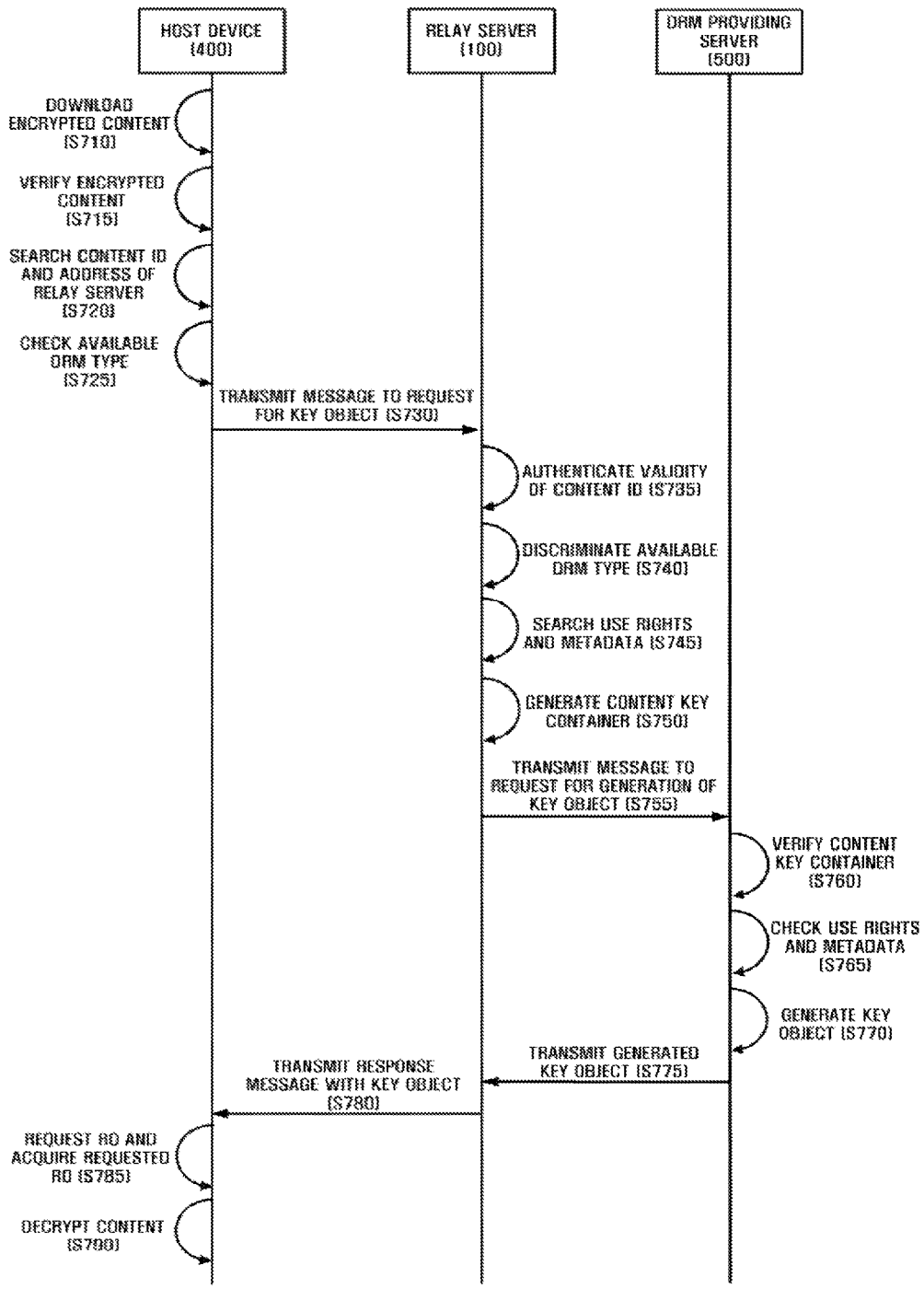
FIG. 7 is a flow diagram illustrating operations executed among a host device, a relay server and a DRM-providing server in the system for providing an encrypted key based on a DRM type of the host device according an exemplary embodiment of the present invention.

FIG. 7 is a flow diagram illustrating operations executed among a host device, a relay server and a DRM-providing server in the system for providing an encrypted key based on the DRM type of the host device according an exemplary embodiment of the present invention.

First, the host device 400 downloads encrypted content from a service-providing server 300 (S710).

Next, validity of the downloaded encrypted content is verified (S715). As a verification result, when the encrypted content is valid, the host device 400 searches content ID and an address of a relay server 100 (S720).

Then, the host device 400 checks available DRM type information in order to use the downloaded content (S725). Next, a request message to request for a key object is transmitted to the searched address of the relay server 100 along with the checked available DRM type information, searched use rights and metadata (S730).

Then, the relay server 100 checks the validity of the content ID transmitted from the host device 400 (S735). When the content ID is valid, the relay server 100 discriminates available DRM types based on the available DRM type information received from the host device 400 (S740).

Next, use rights and the metadata are searched for (S745). The relay server 100 generates a content key container in which the decryption key transmitted from the content-providing server 200 is changed into a format required by the DRM-providing server 500 (S750).

The request message to request generation of the key object is transmitted to the DRM-providing server 500 along with the discriminated DRM type, the searched use rights and metadata, and the generated content key container (S755).

Then, the DRM-providing server 500 verifies the received content key container (S760), and checks the use rights and metadata (S765), and generates a key object by performing DRM packaging based on the discriminated DRM type, the generated content key container, use rights and metadata (S770). If the host device 400 attempts use after completing of DRM packaging using available DRM technology, the generated key object may be the use rights input by the content-providing server 200 for the first time.

Then, the generated key object is transmitted to the relay server 100 (S775). The relay server 100 transmits a response message to the host device 400 along with the received key object (S780).

Next, the host device 400 requests the RO-issuing server 600 transmission of a rights object (RO) to use the encrypted content, and acquires the transmitted RO as requested (S785).

Then, the host device 400 decrypts the encrypted content using the received RO and key object (S790).

A method and apparatus for providing an encrypted key based on the DRM type of a host device of the present invention provide at least the following advantages.

First, compatibility of a host device can be ensured by providing an encrypted key based on the DRM type of the host device.

In addition, since content and DRM technology are independent of each other, efforts for content-providing servers to diversify DRM adopting content can be minimized.

Further, since a key object based on an available DRM type is received from a host device, it is not necessary to manufacture a separate host device for adopting various DRM technologies, thereby minimizing royalty cost payments.

Since an open system for DRM compatibility is provided, content-providing servers, service-providing servers, DRM-providing servers, host device manufactures, and so on, can freely participate in the DRM system.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A method of providing an encrypted key based on a digital rights management (DRM) type of a host device, comprising:
    receiving by a relay server, available DRM type information from the host device and discriminating the received available DRM type information;
    generating by the relay server, a content key container;
    requesting by the relay server, a key object to a DRM-providing server, wherein the key object is a decryption key of a content used by the host device;
    receiving by the relay server, the key object from the DRM-providing server; and
    transmitting by the relay server, the key object to the host device,
    wherein the requesting includes transmitting the discriminated DRM type information to the DRM-providing server, and
    wherein the requesting the key object by the relay server comprises transmitting by the relay server, the content key container to the DRM-providing server.

2. The method of claim 1, further comprising:
    transmitting use rights of the content and metadata of the content to the DRM-providing server.

3. The method of claim 1, wherein the use rights and the metadata are received from a content-providing server.

4. The method of claim 1, wherein the DRM-providing server generates the key object by performing packaging based on the available DRM type information, the generated content key container, the use rights and the metadata.

5. An apparatus for providing an encrypted key based on a digital rights management (DRM) type of a host device, comprising:
    a transceiver which receives available DRM type information from a host device;
    a message generator which generates a message for requesting a key object based on the received available DRM type information; and
    a content key container generator which generates a content key container based on a decryption key of a content used by the host device, the decryption key being received from a content-providing server,
    wherein the transceiver transmits the message for requesting the key object along with the content key container to a DRM-providing server, receives the key object from the DRM-providing server and transmits the received key object to the host device.

6. The apparatus of claim 5, further comprising a controller which discriminates the received available DRM type.

7. The apparatus of claim 5, wherein the key object contains the decryption key of the content used by the host device.

8. The apparatus of claim 5, wherein the DRM-providing server generates the key object by performing packaging based on the available DRM type information, the generated content key container, use rights and metadata.

9. A method of providing an encrypted key comprising:
    receiving by a digital rights management (DRM) providing server, a request message for generating a key object based on available DRM type information of a host device along with a content key container from a relay server;

generating by the DRM providing server, a key object based on the DRM type information of the host device, and transmitting by the DRM providing server, the key object to the relay server.

10. The method of claim 9, wherein the key object is generated based on a decryption key of the content used by the host device, the use rights of the content and the metadata of the content.

11. The method of claim 10, wherein the use rights and the metadata are received by the relay server from a content-providing server.

12. The method of claim 9, wherein the key object contains the decryption key of the content used by the host device.

13. The method of claim 9, further receiving by the digital rights management (DRM) providing server, use rights and metadata of a content from the relay server.

14. A method of providing an encrypted key comprising:
receiving by a digital rights management (DRM) providing server, a request message for generating a key object based on available DRM type information of a host device along with a content key container from a relay server;

performing by the DRM providing server, DRM packaging on a frame of the DRM file to convert the DRM file frame into a DRM file format that be processed by the DRM-providing server;

generating by the DRM providing server, a key object based on the DRM type information of the host device and a data of DRM file format; and transmitting by the DRM providing server, the key object to the relay sever.

15. The method of claim 14, wherein the DRM packaging is binding using a content-encrypted key based on the DRM type supported by a user's host device.

16. The method of claim 14, wherein after completion of the DRM packaging, the content key container is included in the payload portion of the DRM file frame structure.

17. The method of claim 14, wherein the content key container is an entity of data generated from an encrypted key input by a content-providing server in compliant with a data format requested by the DRM-providing server.

18. The method of claim 14, wherein the data of DRM file format includes an encrypted content key, information about use rights, and metadata.

19. The method of claim 14, further receiving by the digital rights management (DRM) providing server, use rights and metadata of a content from the relay server.

* * * * *